3,489,728
PROCESS OF PREPARING POLYMERS OF
1,2-ALKYLENE SULFIDES
Frederick E. Bailey, Jr., Charleston, and Haywood G. France and Leroy R. Pennington, South Charleston, W. Va., assignors to Union Carbide Corporation, a corporation of New York
No Drawing. Filed Mar. 27, 1963, Ser. No. 268,466
Int. Cl. C08g 23/00
U.S. Cl. 260—79          5 Claims This invention relates to novel high molecular weight polymers of 1,2-alkylene sulfides and to the preparation thereof. More particularly, this invention relates to novel solid high molecular weight homopolymers and copolymers of 1,2-alkylene sulfides and to a catalytic method for their preparation.

The preparation of homopolymers and copolymers of 1,2-alkylene sulfides has been described in the literature. However, such polymers were viscous oils, gels or sticky solids having low molecular weights in the range of from about 1,000 to about 10,000 and did not shown properties which would suggest that they would be technically or commercially useful. The preparation of homopolymers and copolymers of 1,2-alkylene oxides has also been described in the literature. But, the 1,2-lower-alkylene oxide polymers, e.g., poly(ethylene oxide) and poly(propylene oxide), are water-soluble polymers. For example, high molecular weight poly(ethylene oxide) is a water-soluble polymer having a melting point of about 65° C., whereas high molecular weight poly(ethylene sulfide) is a water-insoluble polymer having a melting point above about 160° C. In addition, high molecular weight poly(ethylene sulfide) is more thermally stable than high molecular weight poly(ethylene oxide) and can be alkylated by alkylating reagents such as dimethyl sulfate, benzyl chloride, chloroacetic acid and other alkylating agents which react, little, if at all with high molecular weight poly(ethylene oxide).

In a broad aspect, the present invention is directed to the catalytic production of novel solid, high molecular weight homopolymers and copolymers of 1,2-alkylene sulfide monomers. In general, these solid polymers are crystalline thermally stable, water-insoluble polymers having melting points usually above about 160° C., which can be used in the preparation of molded and shaped articles. The most suitable polymers have a "reduced viscosity" greater than 0.1. As used herein the term "reduced viscosity" means that value obtained by dividing the specific viscosity by the concentration of the polymer in the solution, the concentration being measured in grams of polymer per 100 milliliters of solvent at a given temperature, and it is regarded as a measure of molecular weight. The specific viscosity is obtained by dividing the difference between the viscosity of the solution and the viscosity of the solvent by the viscosity of the solvent. Unless otherwise indicated, the reduced viscosity value is determined at a concentration of 0.2 gram of polymer per 100 milliliters of solvent, i.e., acetonitrile, at 30° C.

As indicated above, the novel polymers of this invention are prepared from 1,2-alkylene sulfide monomers. The 1,2-alkylene sulfide monomers can be further characterized by the following formula:

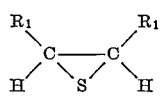

wherein each $R_1$, individually, can be hydrogen, alkyl, cycloalkyl, alkenyl, aryl, haloaryl, aralkyl, or alkaryl radicals. In addition, both $R_1$ variables can be alkene radicals which together with the epithio carbon atoms, i.e., the carbon atoms of the epithio group

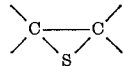

form a cycloalkane ring containing from 4 to 10 carbon atoms, preferably from 4 to 8 carbon atoms, for example, cyclobutyl, cyclopentyl, cyclohexyl, cycloheptyl, cyclooctyl, 2-methylcyclopentyl, 3-amylcycohexyl, and the like. Illustrative $R_1$ radicals include, among others, methyl, ethyl, propyl, butyl, isobutyl, hexyl, isohexyl, 3-propylheptyl, dodecyl, octadecyl, phenyl, chlorophenyl, bromophenyl, benzyl, tolyl, ethylphenyl, butylphenyl, phenethyl, phenylpropyl, cyclopentyl, cyclohexyl, 2-methylcyclohexyl, cycloheptyl, and the like. The preferred $R_1$ variables are hydrogen and alkyl of 1 to 5 carbon atoms.

Representative 1,2-alkylene sulfide monomers which can be employed include, for example, ethylene sulfide, propylene sulfide, 1,2-butylene sulfide, 2,3-butylene sulfide, the epithiopentanes, the epithiohexanes, 2,3-epithioheptane, nonene sulfide, 5-butyl-3,4-epithiooctane, 1,2-epithiododecane, 1,2-epithiohexadecane, 1,2-epithiooctadecane, 5-benzyl-2,3-epithioheptane, 4-cyclohexyl-2,3-epithiopentane, chlorostyrene sulfide, styrene sulfide, ortho-meta-, and para-ethylstyrene sulfide, 1,2-epithiocyclohexane, 3-chloro-1,2-epithiopropane, diisobutylene sulfide, and the like.

Representative solid high molecular weight 1,2-alkylene sulfide polymers include 1,2-alkylene sulfide homopolymers, such as, for example, poly(ethylene sulfide), poly(propylene sulfide), poly(1,2-butylene sulfide), poly(1,2-pentylene sulfide), and the like, and the 1,2-alkylene sulfide copolymers composed of mixtures of different 1,2-alkylene sulfides, such as ethylene sulfide in copolymerized form with propylene sulfide, 1,2-butylene sulfide, styrene sulfide, and the like. The preferred homopolymer is poly(ethylene sulfide), and the preferred copolymer is ethylene sulfide in copolymerized form with styrene sulfide.

The homopolymers and copolymers of the invention can be prepared by contacting the above monomer(s) with a catalytically significant quantity of certain: (1) divalent metal carbonates; (2) alkaline earth metal alcoholates; (3) divalent metal amide-alcoholates; or (4) organometallic compounds described hereinafter.

The (1) divalent metal carbonate catalysts are the carbonates of divalent metals which have an atomic number greater than 11 and which are found below potassium and above tin in the Electromotive Force Series of Elements [1]. These divalent metals include magnesium, calcium, strontium, barium, zinc, cadmium, iron, cobalt, nickel, chromium and manganese. Particularly preferred metal carbonates, from the standpoint of increased and/or ease of preparation in pure form, are the Group II–A metal carbonates; i.e., the calcium strontium, or barium carbonates; Group II–B metal carbonates, i.e., the zinc or cadmium carbonates; manganous carbonate, and magnesium carbonate.

In addition to the above-enumerated divalent metal carbonates, it is also observed that the trivalent metal carbonates of the lanthanide series, i.e., rare earth metals, can be employed as catalysts in the instant invention.

It has been observed that the divalent metal carbonates should contain an amount of sorbed water, i.e., adsorbed or absorbed water, which is sufficient to significantly activate or to impart significant catalytic activity to said metal carbonates. The phenomenon regarding sorbed water contained by the metal carbonates is not entirely

---

[1] Handbook of Chemistry and Physics, 38th edition, p. 1660; published by Chemical Rubber Co., Cleveland, Ohio.

understood at this time nor is it the desire of the inventor to be bound by any theories regarding adsorption of absorption phenomena. It suffices to say that the sorbed water contained by the metal carbonate is firmly tied thereto such that air-drying the metal carbonate for several days at room temperature or slightly above room temperature does not result in any essential weight loss of the sorbed water content in the metal carbonate. The sorbed water bound to the metal carbonates stand in contradistinction to a physical mixture of water and metal carbonate, e.g., an aqueous slurry of metal carbonate, in which latter case the water can be considered to be extraneous water or non-sorbed water. Thus, air-drying a physical mixture of water and metal carbonate results in the removal of the extraneous water on non-sorbed water content from said mixture.

The optimum amount of sorbed water to be contained by the metal carbonates is a natural limit and is governed, to a great extent, by various factors such as the particular metal carbonate contemplated, the method by which the metal carbonate was prepared, the surface area and sorptive characteristics of the metal carbonate, the operative conditions of the polymerization reaction, and other considerations. In general, the greater the surface area of the metal carbonate, the greater the amount of water which can be adsorbed and/or absorbed. As is readily understood, the more hydrophilic metal carbonates, e.g., zinc carbonate, tend to hold greater amounts of sorbed water than those metal carbonates in which the hydrophilic characteristics are slight, e.g., strontium carbonate.

The divalent metal carbonates suitable as catalysts in the process of the instant invention can be prepared by reacting the corresponding divalent metal salt, e.g., the divalent metal chloride, cyanide, and acetate, with sodium carbonate, or other soluble carbonates, and subsequently recovering the resulting divalent metal carbonate precipitate. When the hydroxide of the divalent metal is soluble, the divalent metal carbonate can be obtained as a precipitate by bubbling carbon dioxide into an aqueous solution containing the soluble divalent metal hydroxide.

The second class of catalysts contemplated in the instant process to produce novel polymers are the (2) alkaline earth metal alcoholates. The term "exposure-activated" alkaline earth metal alcoholates will be employed in this specification, including the appended claims to designate those alkaline earth metal alcoholates which have been exposed to (contacted with) water and carbon dioxide according to the teachings herein set forth. The alkaline earth metal alcoholates are compounds containing alkaline earth metal, i.e., strontium, calcium, or barium, in which the metal portion is bonded to mono- or poly-hydroxy organic compounds, e.g., alkanols, cycloalkanols, alkylene glycols, or phenols, through the hydroxy oxygen of at least one of the hydroxy groups of said organic compound. Expressed differently, the alkaline earth metal alcoholates can be characterized by the following formula:

(I)          RO—M—OR wherein M is an alkaline earth metal, i.e., strontium, calcium, or barium; and wherein each R variable can be considered to be derived from the same or different mono- or poly-hydroxy organic compounds. It is to be understood, of course, that when R is a poly-hydroxy organic compound, each M valence also can be separately bonded through two different hydroxyl oxygens of the same R moiety, i.e.,

in which case R also may or may not have free hydroxyl groups (—OH) attached thereto.

The organic portion of the alkaline earth metal alcoholates can be derived, for example, from primary, secondary, and tertiary alkanols and cycloalkanols, e.g., methanol, ethanol, n-propanol, isobutanol, n-pentanol, isopentanol, n-hexanol, dodecanol, 2-ethylhexanol, 2,2-dimethyloctanol, benzyl alcohol, 2-phenylethanol, diphenylcarbinol, pentaerthritol, cyclopentanol, cyclohexanol, 4 - butylcyclohexanol, 3 - octylcyclopentanol, cycloheptanol, and the like; from mono- and polyalkylene glycols, e.g., ethylene glycol, propylene glycol, the butanediols, the pentanediols, 2-methyl-2,3-butanediol, 2-ethyl-1,6-hexanediol, 4,5-octanediol, 1,9-nonanediol, glycerol, β-methylglycerol, diethylene glycol, dipropylene glycol, dibutylene glycol, dipentylene glycol, dihexylene glycol, and the like; from monoalkyl and monoaryl ethers of mono- and polyalkylene glycols, e.g., 2-methoxyethanol, 2-ethoxyethanol, 2-butoxyethanol, 2-benzyloxyethanol, 3-propoxypropanol, 4-hexoxybutanol, 6-benzyloxyhexanol, 2 - (β - methoxyethoxy)ethanol, 2 - (β - butoxyethoxy) ethanol, 3 - (β - ethoxypropoxy)propanol, 4 - (β-hexoxybutoxy)butanol, and the like; from mono- and polyhydroxy-containing aromatic and polyaromatic (including fused aromatic) hydrocarbons, e.g., phenol, resorcinol, catechol, pyrogallol, the cresols, alkyl-substituted phenol, the xylenols, 2,2'-, 2,4'-, 3,3'-, and 4,4'-dihydroxybiphenyl, the naphthols, the naphthalenediols, and the like. The organic portion of the alkaline earth metal alcoholates also can be derived from organic compounds containing both alcoholic hydroxyl and phenolic hydroxy groups. In addition, the organic portion can contain unreactive groups or groups which do not materially affect the polymerization reaction such as alkoxy, aryloxy, aralkyloxy, alkaryloxy, thioether groups, halogen bonded to aromatic carbon sulfones, aromatic nitro groups, amino groups, and the like.

The catalytic activity of the alkaline earth metal alcoholate can be enhanced upon moderate exposure of said alcoholate to carbon dioxide and water. Such exposure results in a weight increase of the alkaline earth metal alcoholate. However, no simple rule of thumb can be given for determining the optimum weight gain necessary to impart maximum catalytic activity to the alcoholate by exposure to carbon dioxide and water since the particular metal alcoholate of choice, its preparation, its surface area, the operative conditions of the polymerization reaction, etc., are influencing factors to be considered in each case. It has been observed that alkaline earth metal alcoholates in which the organic portion is derived from lower saturated aliphatic alcohols, e.g., methanol and ethanol, require less exposure (or less weight gain), than is the case when the organic portion is derived from, for example, n-hexanol, 2-butoxyethanol, alkylene glycols, and the like, to provide enhanced catalytic activity. Exposure of calcium ethylene glycoxide to carbon dioxide substantially saturated with water vapor disclosed that the catalytic activity increased with increase in weight of said glycoloate up to a weight gain of about 60 percent; thereafter the catalytic activity began to decrease. However, even after a gain in weight of about 70 percent, the glycolate was still more active than the unexposed or untreated compound, i.e., calcium ethylene glycolate. In this particular illustration, the optimum gain in weight was ascertained to be about 45 to 60 percent.

The akaline earth metal alcoholates can be prepared, for example, by reacting the appropriate alkaline earth metal with the desired hydroxy-containing organic compound. The preparation can be conducted in an inert or substantially inert organic diluent, e.g., dioxane, or liquid ammonia, or in an excess of the hydroxy-containing organic compound itself. It is preferred that the preparation of the alkaline earth metal alcoholates be conducted under an inert atmosphere such as butane, nitrogen, and the like. During the preparation and storage of the alkaline earth metal alcoholates, it is desirable to minimize the presence of carbon dioxide, water and reactive gases which may come in contact with said alcoholates.

The alkaline earth metal alcoholates in which the organic portion is derived from dihydroxy-containing organic compounds, e.g., ethylene glycol, 1,2-propylene glycol, and the like, can be prepared by reacting the alkaline earth metal per se with the desired dihydroxy-containing organic compound, or, for example, alkaline earth metal methylate with the desired dihydroxy-containing organic compound, preferably in an inert organic diluent. When the latter is employed, it is desirable to heat the reaction medium to a temperature sufficient to remove (in this illustration) the methanol which is given off during the reaction between the alkaline earth metal methylate and the dihydroxy-containing organic compound. A preferred method of preparation is to react the desired dihydroxy-containing organic compound with the alkaline earth metal per se dissolved in liquid ammonia. The resulting product, is then recovered by allowing said liquid ammonia to evaporate therefrom; if desired, the recovered product then can be converted to a finely divided state such as by grinding, pulverizing and the like, under an inert atmosphere.

It should be noted that in the preparation of alkaline earth metal alcoholates such as illustrated above, the presence of the reactants in stoichiometric equivalency in the reaction mixture is not narrowly critical. As an Illustration, favorable catalytic activity in products prepared by the reaction 0.95 to 2.0 mols of ethylene glycol per mol of calcium metal was observed.

As stated previously, enhanced catalytic activity is imparted to the alkaline earth metal alcoholated by exposure to carbon dioxide and water. This can be accomplished, for example by exposing the alcoholate to moist carbon dioxide, preferably carbon dioxide saturated with water vapor, until a weight gain of at least about 0.01 percent, preferably at least about 0.1 percent is observed.

The (3) divalent metal amide-alcoholates (divalent metal-alkylene oxide catalysts) contemplated as a third class of catalysts in the preparation of the polymers of the instant invention can be characterized by the following formula:

(II) 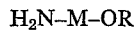 $H_2N-M-OR$ wherein M is a divalent metal which has an atomic number greater than 4 and less than 57 from Group II of the Periodic Table, i.e., magnesium, calcium, zinc, strontium, cadmium, and barium; and wherein R is a monovalent organic radical, preferably a monovalent hydrocarbon radical, e.g., alkyl, cycloalkyl, aryl, alkaryl, aralkyl, alkenyl, and the like. Representative R radicals include among others, methyl, ethyl, propyl, isopropyl, butyl, isobutyl, t-butyl, 2-ethylhexyl, 2,4,4-trimethylpentyl, decyl, dodecyl, cyclopentyl, cyclohexyl, 2-methylcyclopentyl 3-amylcyclohexyl, phenyl, benzyl, tolyl, ethylphenyl, hexylphenyl, octylphenyl, phenethyl, phenylpropyl, phenylbutyl, allyl, 3-butenyl, 3-pentenyl, and the like. In addition, the R radical can contain unreactive groups or atoms, or groups which do not materially affect the polymerization reaction, e.g., sulfones, alkoxy, aryloxy, aromatic nitro groups, and the like. In a preferred aspect the R variable is an alkyl radical which contains from 1 to 10 carbon atoms. It is further preferred that the divalent metal (M) be an alkaline earth metal, i.e., calcium, strontium, or barium. Of the alkaline earth metals calcium is highly preferred.

The alkaline earth metal amide-alcoholate catalysts can be prepared by various routes, for example, the alkaline earth metal amide-alcoholate catalysts can be prepared by the reaction of an epoxide compound, i.e., an epoxide compound which contains a cyclic group composed of two carbon atoms and one oxygen atom, with solid metal hexammoniate or with an ammonia solution of metal hexammoniate.

In practice, the above reaction is most conveniently carried out by dissolving the metal in liquid ammonia followed by slow addition of the epoxide compound to the resulting agitated solution. The reaction can be conducted at a temperature in the range of from about $-70°$ C. and lower, to about $+30°$ C. and higher. In the event an inert vehicle (described below) is employed, the lower temperature limit is above the metling point of said vehicle. It is understood, of course, that whenever liquid ammonia is employed as a reactant and/or vehicle in the chemical equations depicted in this specification, the temperature of the liquid ammonia is below about $-33.4°$ C. at atmospheric pressure, or the temperature and pressure are correlated to thus essentially maintain the ammonia in liquid state. Alternatively, ammonia can be reacted with alkaline earth metal contained in an inert, normally-liquid organic vehicle such as lower dialkyl ether of alkylene glycol, for example, the dimethyl, diethyl or dipropyl ethers of diethylene glycol, and the like; dioxane; saturated aliphatic and cycloaliphatic hydrocarbons, e.g., hexane, heptane, cyclohexane, and the like. When this procedure is followed the alkaline earth metal is added to the inert vehicle while agitating the resulting mixture. Subsequently, ammonia is slowly added to this mixture while maintaining a reaction temperature preferably below about 10° C. to assure formation of the metal hexammoniate. After this, the metal hexammoniate suspension in the inert vehicle can be reacted with the desired epoxide compound to form the metal amide-alcoholate. The divalent metal amide-alcoholates, especially calcium amide-ethylene oxide, are among the preferred catalysts of this invention.

The (4) organometallics contemplated as a fourth class of catalysts in the preparation of the polymers of the instant invention can be characterized by the following formula:

(III) 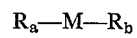 $R_a-M-R_b$ wherein M represents a Group II metal in the Periodic Table, for example, beryllium, magnesium, calcium, strontium, barium, zinc, or cadmium; wherein $R_a$ represents a monovalent hydrocarbon radical; and wherein $R_b$ represents hydrogen, halo, a monovalent hydrocarbon radical, a secondary amino radical, or a hydrocarbyloxy radical, and the like.

The monovalent hydrocarbon radicals can be the aliphatic, aromatic, and alicyclic radicals as exemplified by alkyl, cycloalkyl, aryl, alkaryl, aralkyl, and the like. More specifically, illustrative hydrocarbon radicals include, for instance, methyl, ethyl, isopropyl, n-propyl, n-butyl, t-butyl, isobutyl, sec-butyl, amyl, hexyl, isohexyl, 2-ethylhexyl, 3-methylheptyl, the octyls, the dodecyls, the octadecyls, cyclopentyl, cyclohexyl, cycloheptyl, 2-methylcyclopentyl, 2 - butyl - cyclohexyl, 3 - methylcycloheptyl, phenyl, benzyl, ortho-, meta-, and para-tolyl, the xylyls, butylphenyl, phenethyl, phenylpropyl, phenylbutyl, naphthyl, trimethylphenyl, 9-fluorenyl, and the like. Illustrative secondary amino radicals encompass, for instance, dimethylamino, diethylamino, di-n-propylamino, N-ethylpropylamino, di-2-ethylhexylamino, n-ethyl-m-toluidino, N-propyl-2,3-xylidino, N-methyl-anilino, N-isopropyl-benzylamino, N-phenyl-benzylamino, N-methyl-N-naphthalamino, and the like.

Among the hydrocarbyloxy radicals can be listed, for instance, alkoxy, aryloxy, cycloalkyloxy, and the like, e.g., methoxy, ethoxy, isopropoxy, n-propoxy, n-butoxy, t-butoxy, hexoxy, 2-ethylhexoxy, octoxy, decoxy, dodecoxy, octadecoxy, phenoxy, ortho-, meta-, and para-toloxy, 2-propylphenoxy, butylphenoxy, n-undecyphenoxy, 2-phenethoxy, benzyloxy, cyclopentyloxy, cyclohexyloxy, cycloheptyloxy, alkylcyclohexyloxy, and the like. The halo radicals include chloro, bromo, and iodo.

Illustrative classes of organometallic catalysts which can be employed in the process of the invention include, for example, dialkylzinc, alkylzinc halide, alkylzinc alkoxide dialkylberyllium, alkylberyllium halide, dialkylmagnesium, alkylmagnesium halide, alkylmagnesium alkoxide, dialkylcadmium, alkylcadmium halide, diarylzinc, diarylberyllium, diarylmagnesium, alkylmagnesium dialkylamine, alkylcalcium halide, and the like. Specific examples of the organometallic catalysts include, among others, diethylzinc, di-n-propylzinc, di-n-butylzinc, di-2-ethylhexylzinc, diphenylzinc, n-butylzinc butoxide, octylzinc chloride, phenylzinc bromide, dimethylmagnesium dipropylmagnesium, propylphenylmagnesium, n-butylmagnesium chloride, diphenylmagnesium phenylmagnesium chloride, dimethylberyllium diethylberyllium, ethylcalcium iodide, dimethylcadmium, diethylcadmium, dipropylcadmium, diisobutylcadmium, diisoamylcadmium, diethylbarium, diphenylbarium, dibutylbarium, diethylstrontium, butylzinc diethylamide, ethylzinc dipropylamide, and the like. The organometallics, especially dibutylzinc, are also among the preferred catalysts of this invention.

The catalysts are employed in catalytically significant quantities. In general, a catalyst concentration in the range of from about 0.001, and lower, to about 10, and higher, weight percent based on the weight of total monomeric feed, is suitable. A catalyst concentration in the range of from about 0.01 to about 3.0 weight percent is preferred. A catalyst concentration in the range of from about 0.05 to about 1.0 weight percent is highly preferred. For optimum results, the particular catalyst employed, the nature of the monomeric reagent(s), the operative conditions under which the polymerization reaction is conducted, and other factors will largely determine the desired catalyst concentration.

The polymerization reaction can be conducted at a temperature in the range of from about 0° and lower, to about 200° C., and preferably from about 25° to about 100° C. As a practical matter, the choice of the particular temperature at which to effect the polymerization reaction depends, to an extent, on the nature of the 1,2-alkylene sulfide employed, the particular catalyst employed, the concentration of the catalyst, and the like.

In general, the reaction time will vary depending on the operative temperature, the nature of the monomer(s) employed, the particular catalyst and the concentration employed, the use of an inert organic diluent, and other factors. The reaction time can be as short as a few hours, or shorter, in duration or it can be as long as several days. A feasible and suitable reaction period is from about 5 hours, and lower, to about 100 hours, and longer.

The polymerization reaction takes place in the liquid phase and a pressure above atmospheric may be employed to maintain the liquid phase. However, in the usual case, external pressure is unnecessary, and it is only necessary to employ a reaction vessel capable of withstanding the autogenous pressure of the reaction mixture. It is highly desirable to conduct the polymerization reaction under substantially anhydrous conditions.

The copolymer can be prepared via the bulk polymerization, suspension polymerization, or the solution polymerization routes. The polymerization reaction can be carried out in the presence of an inert organic diluent such as, for example, aromatic solvents, e.g., benzene, chlorobenzene, toluene, xylene, ethylbenzene, and the like; various oxygenated organic compounds such as anisole, the dimethyl and diethyl ethers of ethylene glycol, of propylene glycol, of diethylene glycol, and the like; normally-liquid saturated hydrocarbons, e.g., pentane, hexane, heptane; cycloalkanes, e.g., cyclopentane, cyclohexane, and the like. If desired, a mixture of miscible inert normally-liquid organic vehicles can be employed.

The process of the invention can be executed in a batch, semi-continuous, or continuous fashion. The reaction vessel can be a glass vessel, steel autoclave, elongated metallic tube, or other equipment and material employed in the polymer art. The order of addition of catalyst and monomeric reactant(s) does not appear to be critical. A suitable procedure is to add the catalyst to the reaction zone containing the monomeric reactant(s) and inert organic vehicle, if any. If desired, the catalyst can be in solution or suspension (in an inert-normally-liquid organic vehicle).

Unreacted monomeric reactant(s) can oftentimes be recovered from the reaction product mixture by conventional techniques such as by heating said reaction product mixture under reduced pressure. The polymeric product can be recovered from the reaction product mixture by filtration or, if the polymer is substantially soluble in the inert organic vehicle employed in the reaction, by the addition of a second organic vehicle which is miscible with the first vehicle but which is non-solvent for the polymeric product, followed by filtration of the precipitated polymeric product.

The following examples are illustrative.

PREPARATION OF CALCIUM AMIDE-ETHYLENE OXIDE CATALYST

Example 1

Liquid ammonia (2 liters) was added to a 3-liter glass resin flask (maintained in a Dry Ice-acetone bath, the temperature of which was below the boiling point of liquid ammonia) while avoiding exposure to the atmosphere. Ethylene oxide (10 grams) was then dissolved in the stirred liquid ammonia. Subsequently, calcium metal nodules (100 grams) were added to the ethylene oxide-ammonia solution over a 15-minute period while stirring was continued. The flask was allowed to stand overnight exposed to room temperature conditions (approximately 20°–22° C.) while the ammonia weathered off. The solid product was transferred, at room temperature, in a nitrogen-filled "dry box," to a one-gallon stainless steel container half filled with glass marbles. Two liters of heptane were added to said container which was then agitated in a reciprocating point shaker for one hour thus producing a catalyst slurry or suspension in heptane.

Example 2

In substantially the same manner as in Example 1, a catalyst slurry in heptane was prepared from 4 pounds of calcium metal and 2.4 pounds of ethylene oxide. Such slurry was used as the catalyst source in Example 4.

Example 3

In substantially the same manner as in Example 1, a catalyst slurry in heptane was prepared from 4 pounds of calcium metal and 2 pounds of ethylene oxide. Such slurry was used as the catalyst source in Example 9.

PREPARATION OF HOMOPOLYMERS OF 1,2-ALKYLENE SULFIDES

Example 4

To a Pyrex glass polymerization tube there were added 5 grams of ethylene sulfide and 0.01 gram of the calcium amide ethylene oxide catalyst of Example 2 as a heptane suspension. The tube was sealed and heated, with gentle agitation, to a temperature of about 90° C. for a period of about 4 hours to effect polymerization. At the end of this period, the tube was opened and 4 grams of poly(ethylene sulfide) as a white powder was recovered. The softening point of the poly(ethylene sulfide), i.e., the temperature at which a sample of the polymer flowed while being subjected to a light pressure applied by a laboratory spatula, was about 195° C.

A disc was molded from the poly(ethylene sulfide) at a temperature of about 200° C. and a pressure of about 500 p.s.i.g. X-ray diffraction patterns obtained from thin slices of this disc showed the poly(ethylene sulfide) to be highly crystalline.

Example 5

To a Pyrex glass polymerization tube there were added 5 grams of ethylene sulfide and 0.01 gram of dibutylzinc. The tube was sealed and heated, with gentle agitation, to about room temperature for a period of about 18 hours to effect polymerization. At the end of this period, the tube was broken open and 3.6 grams of poly(ethylene sulfide) as a white powdery material was recovered. The softening point of the poly(ethylene sulfide) was about 170° C. X-ray diffraction patterns obtained from thin slices of a disc molded from the above polymer showed the polyethylene sulfide to be crystalline.

Example 6

To a Pyrex glass polymerization tube there were added 5 grams of propylene sulfide and 0.01 gram of dibutylzinc. The tube and its contents were cooled and the tube was sealed. The tube was gently agitated by end over end rotation at room temperature, i.e., about 24° C., for a period of about 20 hours to effect polymerization. At the end of this period, the tube was broken open and the solid polymeric product was precipitated by the addition of hexane, filtered and dried under reduced pressure. There was obtained 3.5 grams of poly(propylene sulfide), which had a reduced viscosity value at a concentration of 0.2 gram of polymer per 100 milliliters of benzene at 30° C., of 0.34. The poly(propylene sulfide) was found to be soluble in benzene, toluene and dimethylformamide, but insoluble in acetone and acetonitrile.

Example 7

To a Pyrex glass polymerization tube there were added 2 grams of styrene sulfide and 0.015 gram of dibutylzinc. The tube was sealed and heated to a temperature of about 90° C., with gentle agitation, for a period of about 17 hours to effect polymerization. At the end of this period the tube was broken open and the contents removed. There was obtained 1.5 grams of poly(styrene sulfide) as a yellow tacky solid polymer having a reduced viscosity value of 0.13 at a concentration of 0.2 gram of polymer per 100 milliliters of dimethyl sulfoxide at 30° C.

Example 8

To a Pyrex glass polymerization tube there were added 2 grams of 1,2-diisobutylene sulfide and 0.015 gram of dibutylzinc. The tube was sealed and heated to a temperature of about 90° C., with gentle agitation, for a period of about 17 hours to effect polymerization. At the end of this period the tube was broken open and the contents removed. There was obtained 1.1 grams of poly(1,2-diisobutylene sulfide) as a light cream colored waxy solid, which was insoluble and dimethyl sulfoxide.

Example 9

To a Pyrex glass polymerization tube there were added 2 grams of 3-chloro-1,2-epithiopropene and a heptane suspension of the calcium amide-ethylene oxide catalyst of Example 3, containing 0.01 gram of catalyst. The tube was sealed and heated to a temperature of about 90° C., with gentle agitation, for about 16 hours to effect polymerization. At the end of this period the tube was broken open and the contents removed. There was obtained 1.1 grams of poly(3-chloro-1,2-epithiopropene sulfide) as a yellow tacky polymer. The reduced viscosity of the polymer in 0.2 percent dimethyl sulfoxide solution at 30° C. was 0.16.

PREPARATION OF COPOLYMERS OF 1,2-ALKYLENE SULFIDES

Example 10

To a Pyrex glass polymerization tube there were added 10 grams of ethylene sulfide, 0.8 gram of propylene sulfide, 0.032 gram of dibutylzinc, and 20 ml. of heptane. The tube was sealed and heated, with gentle agitation, to a temperature of about 90° C. for a period of about 16 hours to effect polymerization. At the end of this period the tube was opened and the contents removed. There was obtained 9.7 grams of ethylene sulfide in copolymerized form with propylene sulfide as a white granular polymer, having a softening range of from about 175° C. to about 180° C. The polymer was insoluble in water, acetonitrile, benzene and dimethyl sulfoxide.

Example 11

To a Pyrex glass polymerization tube there were added 4 grams of ethylene sulfide, 1 gram of styrene sulfide, 0.015 gram of dibutylzinc, and 20 ml. of heptane. The tube was sealed and heated, with gentle agitation, to a temperature of about 90° C. for a period of about 16 hours to effect polymerization. At the end of this period the tube was broken open and the contents removed. There was obtained 3.4 grams of ethylene sulfide in copolymerized from with styrene sulfide as a white granular polymer, having a softening point of about 170° C. The styrene sulfide content of the polymer was calculated to be 15.5 weight percent.

The 1,2-alkylene sulfide homopolymers and copolymers of this invention find important utility as additives for the 1,2-alkylene oxide polymers, especially the water-soluble polymers, e.g., poly(ethylene oxide), to give desirable thermoplastic polymers and to vary the water-solubility thereof, as lubricants, and as finishing agents in fibers and textiles.

Although the invention has been illustrated by the preceding examples, it is not to be construed as limited to the materials employed therein, but rather, the invention encompasses the generic area as hereinbefore disclosed. Various modifications and embodiments of this invention can be made without departing from the spirit and scope thereof.

What we claim is:

1. A process for polymerizing a monomeric 1,2-alkylene sulfide, said monomeric sulfide being selected from the group consisting of ethylene sulfide, propylene sulfide, styrene sulfide and combinations thereof, which comprises contacting said monomeric sulfide with a catalytic quantity of a polymerization catalyst, which is a divalent metal amide alcoholate of a hydroxy-containing organic compound having from 1 to 10 carbon atoms, at a temperature of from about 0° C. to about 200° C.

2. A process for polymerizing monomeric ethylene sulfide which comprises contacting said monomeric sulfide with from about 0.01 to about 3.0 weight percent, based on the weight of said monomeric sulfide, of calcium amide-ethylene oxide catalyst at a temperature of from about 25° C. to about 100° C.

3. A process for polymerizing monomeric ethylene sulfide with monomeric propylene sulfide which comprises contacting said monomeric sulfides with from about 0.01 to about 3.0 weight percent, based on the weight of said monomeric sulfides, of calcium amide-ethylene oxide catalyst at a temperature of from about 25° C. to about 100° C.

4. A process for polymerizing monomeric ethylene sulfide with monomeric styrene sulfide which comprises contacting said monomeric sulfides with from about 0.01 to about 3.0 weight percent, based on the weight of said monomeric sulfides, of calcium amide-ethylene oxide catalyst at a temperature of from about 25° C. to about 100° C.

5. The process for polymerizing styrene sulfide which comprises contacting said monomeric sulfide with from about 0.01 to about 3.0 percent per weight based on the weight of said monomeric sulfide of calcium amide-ethylene oxide catalyst at a temperature of from about 25° C. to about 100° C.

References Cited

UNITED STATES PATENTS

| | | | |
|---|---|---|---|
| 1,976,678 | 10/1934 | Wittwer | 260—2 |
| 2,183,860 | 12/1939 | Coltof | 260—79 |
| 2,870,100 | 1/1959 | Stewart et al. | 260—2 |
| 2,897,178 | 7/1959 | Hill | 260—2 |
| 2,934,505 | 4/1960 | Gurgiolo | 260—2 |
| 2,971,988 | 2/1961 | Hill | 260—2 |
| 3,000,865 | 9/1961 | Gurgiolo | 260—79 |
| 3,071,593 | 1/1963 | Warner | 260—327 |
| 3,222,326 | 12/1965 | Broadway | 260—79.7 |
| 3,365,431 | 1/1968 | Gobran et al. | 260—79 |

(Other references on following page)

FOREIGN PATENTS 1,122,710   1/1962   Germany.
  898,314   6/1962   Great Britain.

OTHER REFERENCES

Marvel et al.: Journal of the American Chemical Society, vol. 76, p. 61.

Boileau et al.: 252 Compt. Revd., No. 6, pp. 882–884 (1961).

Boileau et al.: 254 Compt. Revd., pp. 2774–2776 (1962).

Miles et al.: "Dithiols, part XII, The Alkaline Hydrolysis of Acetylated Hydroxy Thiols—A New Reaction for the Formation of Cyclic Sulfides," J. Chem. Soc. (London), 1952, pp. 817–826, p. 817 espec. relied upon.

Ohta et al.: "Studies on Ethylene Sulfide I, Polymerization of Ethylene Sulfide" as reported in Chem. Ads., vol. 51 (1957) p. 14668.

JAMES A. SEIDLECK, Primary Examiner

U.S. Cl. X.R.

260—32.6, 33.6, 79.7